United States Patent Office 3,212,559
Patented Oct. 19, 1965

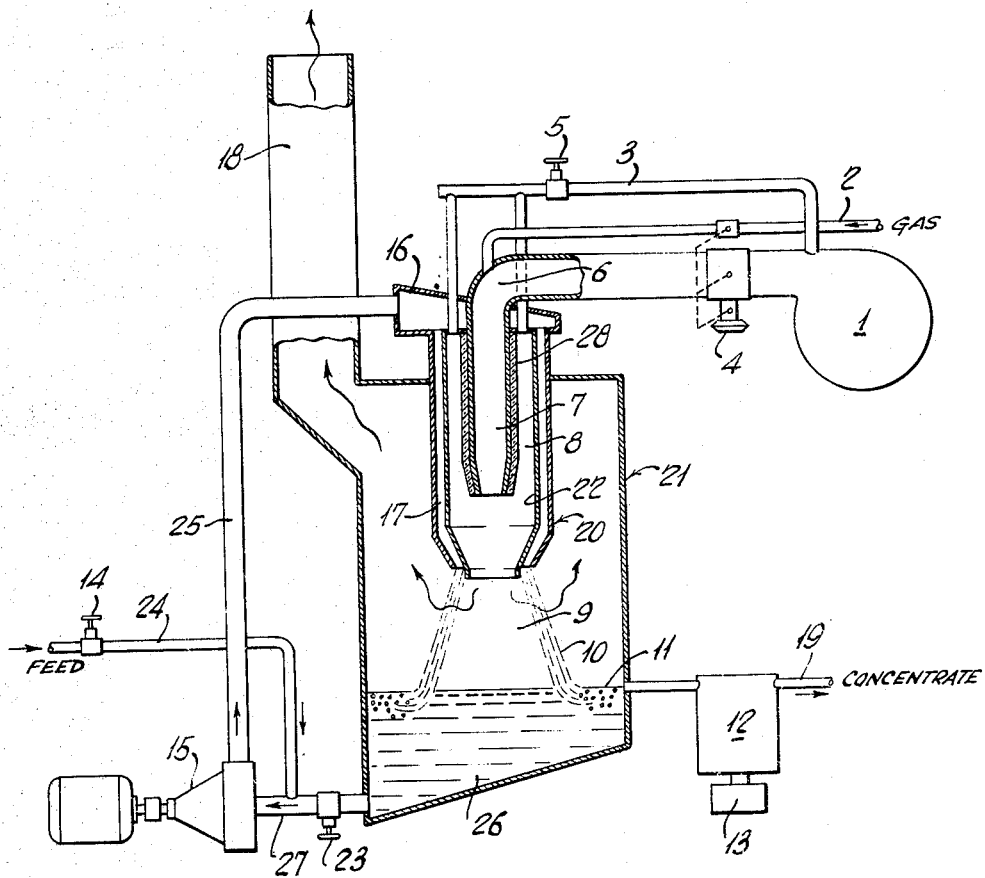

3,212,559
METHOD OF CONCENTRATING LIQUID-CONTAINING MIXTURES
John T. Williamson, Milledgeville, Ga., assignor, by mesne assignments, to Freeport Sulphur Company, New York, N.Y., a corporation of Delaware
Filed Nov. 29, 1962, Ser. No. 240,847
7 Claims. (Cl. 159—4)

The present invention deals with an improved system for concentrating liquid-containing mixtures. More particularly, it relates to the concentration of heat sensitive materials prone to caking and particularly to concentration of such materials to relatively high concentrations of the solid phase.

The problem of concentrating liquid containing mixtures is one often faced by the process engineer. Numerous types of evaporators for vaporizing the liquid component of the mixture and thus obtaining a concentrate of non-vaporized materials have been suggested. Thus, for example, the use of steam coils immersed in the liquid mixture, submerged burners, etc., are well known in the art. However, particular difficulty has been encountered in the concentration of a variety of materials which are sensitive to overheating and tend to cake. Thus, for example, in the clay industry considerable difficulty has been encountered in concentrating clay water suspensions to the upper range of solids content wherein the material becomes extremely viscous. Similar problems are encountered in the concentration of alum-water slurries, calcium carbonate slurries, titanium dioxide-water mixture, gypsum slurries, cement and lime slurries.

Means are now taught for concentrating liquid-containing mixtures, particularly liquid-solid mixtures in a manner offering extremely high thermal efficiency, elimination of the caking of solid components, as well as highly effective use of streams to be concentrated for reducing thermal strain about the elements of the burner zone. More specifically, the present invention deals with a thermal concentrator wherein a non-submerged burner zone is employed and feed liquid mixture to be concentrated is circulated as an annular curtain about the discharge portion of the burner zone. The liquid "curtain" insures highly effective contact between the hot flue gases of the burner zone and the mixture to be concentrated, the resulting vaporized liquid components being withdrawn overhead. In a preferred embodiment, the liquid mixture to be contacted is circulated about the burner zone so as to relieve thermal stress while being itself preheated, the liquid mixture then being discharged as a "curtain" about the burner zone discharge portion.

In general, the liquid blanket about the discharge of the burner zone will form a relatively enclosed zone forcing the flue gases largely into a reservoir of liquid mixture in the lower portion of the concentrator wherein the flue gases further contact the mixture with the resulting additional vaporization of liquid components.

In a further desirable embodiment, a secondary supply of air or other oxygen-containing gas for the burner zone is introduced towards the discharge portion of the fuel-air passageway in the burner zone and serves to control the gas outlet temperature and thus protect overheating of heat sensitive materials. The secondary air also serves to air cool the burner tubes and refractory, thus preventing their warping, cracking or overheating, as well as overheating of the liquid-containing material to be concentrated which is preferably being circulated about the burner zone shell.

The present invention offers numerous advantages. It employs a flash type evaporator characterized by non-submerged burner while having extremely high thermal efficiencies in the range of 90 to 95 percent. The liquid mixture to be concentrated cools the burner tubes while itself being preheated and thus prevents thermal stress, as well as high temperature spots which might cause caking of the solid components of the mixture. By having a "curtain" of feed liquid surround the flue gas as it is being discharged from the burner zone caking is eliminated when the hot gases and liquid material initially contact each other. The exhaust gases, i.e., evaporated liquid and flue gas, are essentially saturated at all times with the liquid to be vaporized thus preventing any after-drying and caking on the walls of the tank. Intimate gas liquid and solids contacted at elevated temperatures may thus be insured with it being possible to employ a wide range of burner gas temperatures, e.g., 400 to 2500° F., while maintaining proper conditions to prevent overheating of heat sensitive components of the liquid mixture.

The present invention, as indicated previously, may be employed to concentrate a wide variety of liquid containing mixtures. In addition to the previously noted admixtures, the present invention can be employed in the concentration of chemicals from their reactant solutions, e.g., urea from water and pulp and paper waste liquors from water, or recovering polymers from the reacting solutions, such as polyolefins, e.g., polyethylene, polypropylene from paraffinic organic diluents, e.g., methyl chloride. While the present invention has particular importance in the clay and/or mineral industries where it is necessary to concentrate solids from water slurries, it obviously can be employed in the broad treatment of a variety of liquid-containing mixtures. Further, the present invention finds utility in the concentration of liquid-liquid mixtures, as well as of liquid-solid mixtures. Thus it can serve to evaporate the more volatile liquid component and produce a concentrate of the less volatile materials. Examples of such operations are the normal concentration of liquid solutions, such as acid concentrators, e.g., phosphoric acid, sulfuric acid, etc., as well as the general concentration of true liquid solutions. The present invention can be used in the concentration of soluble salt solutions for crystallization, purification and/or recovery. The present process offers a more economical method of steam distillation due to the higher thermal efficiency of steam generation, or can be used as an extremely efficient continuous process stream heater, for example, the heating of clay-water slurries from 65° F. to 120° F.

By way of clarifying the nature of the present invention, the term "non-submerged burner" is employed to denote that the present burner zone is suspended above the surface of the principal liquid reservoir in the concentration zone and that a flowing liquid curtain rather than enclosure by relatively stationary liquid reservoirs insures liquid-gas contact. The term "liquid curtain" denotes the relatively rapid flowing liquid mass surrounding the discharge portion of the burner zone.

It is to be clearly understood that the present concentrator is distinguished from various conventional spray drying systems, wherein a liquid mass of material is atomized by hot gases discharging across the path of the liquid mass. In the present process the liquid mass essentially discharges about the hot gas stream and a relatively continuous liquid curtain is formed about the flue gases discharging from the burner zone.

Various aspects and modifications of the present invention will be made more clearly apparent by reference to the following descriptive example and accompanying drawing.

With reference to the drawing, shown therein is a typical apparatus-process configuration employing the essential elements of the present invention. Concentrator 21 may take the form of a tank or similar vessel. A liquid-containing mixture is fed thereto through line 24.

Automatic valve 14 can be employed to automatically control the volume weight relationship of the feed materials in line 24 and thus control the ultimate percentage of solids in the concentrate product to be redrawn through line 19.

Suspended in the upper portion of concentrator 21 is burner zone 20. Burner zone 20 preferably takes the form of a series of annularly related passageways. Passageway 7 defines the principal path of the fuel-air mixture undergoing combustion. Passageway 17 is annularly disposed about zone 7 serving as a conduit for the liquid-containing mixture to be evaporated. Preferably secondary air is additionally supplied and passes via annulus 8 to be admixed with the fuel-air mixture in the lower portion of the burner zone thus serving to control the degree of oxidation and thus the ultimate temperature of the flue gases.

Fuel, such as methane, propane or other light hydrocarbon gases, is supplied to burner 20 through gas line 2. The combustion air or other oxygen-containing gas may be furnished by a centrifugal blower 1 or other conventional device, the air (or other oxygen-containing gas) being mixed with the fuel gas in mixing chamber 6 of the burner. Automatic valve 4 is employed to give the proper ratio of air to gas desired for combustion. Primary combustion takes place in chamber 7. If desired, chamber 7 may be lined with fire brick or other heat resisting material. Secondary air may be introduced via line 3 in amounts controlled by valve 5, secondary air passing through annulus 8 and mixing with combustion gases in the lower portion of the burner zone. The secondary air controls the outlet temperature of the evaporator at section 9, as well as keeping the downcoming tube 22 of the evaporator relatively cool. Additional thermal insulation such as fire clay can be employed on tube 22, if extremely heat sensitive materials, e.g., pharmaceuticals, are to be treated.

The liquid-containing mixture to be concentrated passes through metering valve 14 and line 24. The feed mixture circulates through pump 15 and line 25 for discharge about the effluent of the burner zone. Normally, it is desired to recirculate a least a portion of the liquid reservoir 26 in the lower portion of concentrator 21, this being effected via line 27 with control on the degree of recycle being obtained by means of valve 23. The liquid mixture to be treated passes from line 25 through housing 16 and then downwardly through annular space 17 surrounding the combustion zone. The liquid mixture absorbs the conduction heat from the downcomer tube 22 of the evaporator while itself being preheated so as to aid in the vaporization of its liquid components. As the liquid mixture leaves downcomer tube 17 it forms a liquid "curtain" 10 surrounding the hot flue gas effluent leaving the lower portion 9 of the burner zone. This liquid "curtain" traps the hot gases emerging from the burner zone and forces gas liquid contact between the liquid "curtain" and the burner gases, as well as promoting flow of the gases into liquid reservoir 26 in the lower portion of the concentrator. By having enclosed the flue gases with the liquid stream the flue gases are introduced to the liquid reservoir at a relatively high velocity and thus tend to take the form of fine bubbles 11. This further insures good gas liquid contact and thus maximum thermal efficiency as well as saturation of the effluent gases withdrawn overhead through vent 18.

The concentrate is withdrawn via line 19. Normally the concentrate will overflow from vessel 21 into a constant volume tank 12 which is connected to load cell 13. Load cell 13 controls feed valve 14 and/or gas-air ratio valve 4 by means of suitable connections and thus insures the proper and automatic degree of concentration desired.

By way of illustrating a typical system characteristic of the present invention the concentration of a water-clay slurry will be described. The water-clay slurry fed via line 24 has initial solids content of about 55 to 65 weight percent, e.g., 60%. It is fed through line 24 at a rate of about 444.6 pounds per minute of slurry. A concentrate containing about 70 to 72% solids is withdrawn through line 19. Natural gas at a pressure of 3 p.s.i.g. is introduced through line 2 and admixed with about 16 volumes of primary air per volume of natural gas in zone 6. About 0.7 cubic foot of secondary air per total standard cubic feet primary air and natural gas is added to the burner zone via lines 3 and annulus 28. Sufficient water slurry is recycled from reservoir 26 so that about 100 cubic feet of slurry per minute circulates through annulus 17 and forms curtain 10 about the discharging flue gases emanating from the burner zone at a temperature of about 2000° F. Under these conditions the normal exhaust stack temperature 18 is about 175° F. The concentrated product 19 temperature is about 165° F.

By operating in this manner it has been found that the clay slurry may be concentrated to the upper liquid-solids phase wherein the material becomes extremely viscous without causing caking or overheating of the solids phase.

Having described the present invention, that which is sought to be protected is set forth in the following claims.

I claim:

1. An improved process for concentrating liquid-containing mixtures by vaporization of liquid components which comprises forming a hot combustion effluent gaseous stream in a burned zone, discharging said combustion effluent gas stream downwardly and above an open reservoir of said liquid mixture, passing liquid mixture about the path of said hot gases so as to surround said gases, said liquid mixture being discharged somewhat above and about the point of discharge of said hot gaseous stream in the form of a massive free falling continuous annular liquid curtain contiguous with the discharged gas stream thus enveloping said gases and forming a gas space enclosed by the liquid curtain and reservoir liquid surface, said massive curtain enclosing substantially all of said discharged gas stream so as to force the major portion of said discharged gaseous stream into said reservoir, through said reservoir and around said curtain.

2. The process of claim 1 wherein said liquid mixture is passed through an annular passageway positioned about said burner zone, thus cooling said zone while being preheated.

3. The process of claim 1 wherein said liquid contains liquid and solid components, and liquid is recirculated from said reservoir to form in part said flowing liquid curtain.

4. An improved method for concentrating liquid containing mixtures which comprises employing a non-submerged burner zone providing a downwardly directed gas stream, and positioned above an open reservoir of liquid mixture, passing liquid in annular pathway about said burner zone and discharging said liquid as a stream somewhat above and about the gas discharge end of said burner zone in the form of a massive freely-falling continuous annular liquid curtain contiguous with the discharged gas stream, thus forming a gas space of burner zone gases enclosed by the liquid curtain and the reservoir liquid surface, said massive curtain enclosing substantially all of said discharged gaseous stream so as to force the major portion of said discharged gaseous stream into said reservoir, through said reservoir and around said curtain thereby insuring good contact of said gaseous stream with said liquid curtain and said liquid reservoir.

5. The process of claim 4 wherein said liquid mixture is a clay-water slurry.

6. An improved thermal concentrator which comprises a vessel adapted to contain a liquid reservoir in its lower portion, a burner positioned above the lower portion of said vessel, said burner comprising a passageway for burning gases, said passageway discharging into the open area above said liquid reservoir, a second passageway for liquid mixtures positioned about said passageway for burning gases and discharging liquid mixtures in the form of a massive, peripherally continuous curtain, said second passageway discharging somewhat above and about the effluent portion of said first passageway into the open area above said liquid reservoir to discharge said liquid mixture as a free falling annular massive curtain contiguous with the discharging terminal end of said burner passageway to enclose said gases discharged therefrom and force the major portion of said discharged gases into said reservoir, through said reservoir and around said massive liquid curtain.

7. Apparatus of claim 6 which further contains means for introducing oxygen-containing gas and fuel gas to said first passageway, means for introducing a liquid-containing mixture into said second passageway and means for withdrawing vaporized materials from the upper portion of said vessel and materials of reduced liquid content from the lower portion of said vessel.

References Cited by the Examiner
UNITED STATES PATENTS

| | | | |
|---|---|---|---|
| 1,561,971 | 11/25 | Coffin et al. | 159—48 |
| 1,955,277 | 4/34 | Fasting. | |
| 1,957,138 | 5/34 | Hasselbach. | |
| 2,092,470 | 9/37 | Peebles | 159—16 X |
| 2,327,039 | 8/43 | Heath | 159—13 X |
| 2,328,892 | 9/43 | Colgate et al. | 159—48 X |
| 2,394,643 | 2/46 | Switzer. | |
| 2,640,761 | 6/53 | Wiseman | 159—4 X |
| 2,731,081 | 1/56 | Mayner. | |
| 2,753,594 | 7/56 | Buck | 139—13 |
| 2,900,975 | 8/59 | Northcott | 159—16 X |
| 3,104,947 | 9/63 | Switzer et al. | 159—16 X |

ROBERT F. BURNETT, *Primary Examiner.*
NORMAN YUDKOFF, *Examiner.*